(12) United States Patent
Hosoda (10) Patent No.: US 7,733,379 B2
(45) Date of Patent: Jun. 8, 2010

(54) COMPOSITE STILL-IMAGE CREATING DEVICE CAPABLE OF CREATING A STILL IMAGE FROM MOVING IMAGES

(75) Inventor: Jun Hosoda, Hanno (JP)

(73) Assignee: Casio Computer Co., Ltd., Tokyo (JP)

( * ) Notice: Subject to any disclaimer, the term of this patent is extended or adjusted under 35 U.S.C. 154(b) by 1296 days.

(21) Appl. No.: 10/863,859

(22) Filed: Jun. 7, 2004

(65) Prior Publication Data

US 2004/0252765 A1 Dec. 16, 2004

(30) Foreign Application Priority Data

Jun. 13, 2003 (JP) .............................. 2003-169664

(51) Int. Cl.
- H04N 5/228 (2006.01)
- H04B 1/66 (2006.01)
- H04N 7/12 (2006.01)
- H04N 11/02 (2006.01)
- H04N 11/04 (2006.01)
- G09G 5/00 (2006.01)

(52) U.S. Cl. .............................. 348/222.1; 375/240.16; 345/629

(58) Field of Classification Search .............. 348/220.1, 348/218.1; 375/240.16, 240.12; 345/629
See application file for complete search history.

(56) References Cited

U.S. PATENT DOCUMENTS 5,812,195 A * 9/1998 Zhang .................... 375/240.16
5,970,504 A * 10/1999 Abe et al. .................... 715/205
6,496,607 B1 * 12/2002 Krishnamurthy et al. .... 382/282
6,665,342 B1 * 12/2003 Brown et al. ........... 375/240.16
6,876,701 B1 * 4/2005 Chujoh et al. .......... 375/240.08
7,123,275 B2 * 10/2006 Takeshima et al. .......... 345/629
2002/0172284 A1 * 11/2002 Peng et al. ............. 375/240.15
2003/0161402 A1 * 8/2003 Horowitz ............... 375/240.16
2004/0125115 A1 * 7/2004 Takeshima et al. .......... 345/634

FOREIGN PATENT DOCUMENTS

| JP | 06-292203 A | 10/1994 |
| JP | 09-102910 A | 4/1997 |
| JP | 09-154061 A | 6/1997 |
| JP | 09-252467 A | 9/1997 |
| JP | 11-331693 A | 11/1999 |
| JP | 11331693 | * 11/1999 |
| JP | 2000-184360 A | 6/2000 |

* cited by examiner

*Primary Examiner*—Sinh Tran
*Assistant Examiner*—Christopher K Peterson
(74) *Attorney, Agent, or Firm*—Frishauf, Holtz, Goodman & Chick, P.C.

(57) ABSTRACT

Each of the frames forming moving images is decoded in sequence and while a candidate frame is decoded, a decision is made as to whether or not the motion vector variable-length decoded for each macroblock is greater than a threshold, so that if the motion vector is greater than the threshold, the decoded image of the corresponding block is decided as a partial image forming a subject portion that had motion in the candidate frame and then combined with a base image stored in a still memory in a combining unit, whereby, by repeating this process, a composite still image which allows the motion of the subject to be grasped visually is created in the still memory.

13 Claims, 12 Drawing Sheets

BLOCK DECIDED
TO BE GREAT
IN MOTION VECTOR

SURROUNDING
BLOCKS

| BLOCK NUMBER | MOTION VECTOR | ADOPTION DECISION |
|:---:|:---:|:---:|
| ⋮ | ⋮ | ⋮ |
| 21 | (2, 1) | ✕ |
| 22 | (2, 1) | ✕→◯ |
| 23 | (10, -12) | ◎ |
| 24 | (2, 1) | ◯ |
| ⋮ | ⋮ | ⋮ |

FIG.8

| BLOCK NUMBER | MOTION VECTOR | PREDICTION ERROR | ADOPTION DECISION |
|---|---|---|---|
| ⋮ | ⋮ | ⋮ | ⋮ |
| 21 | (2, 1) | LARGE | × |
| 22 | (2, 1) | SMALL | × |
| 23 | (10, −12) | LARGE | ◎ |
| 24 | (2, 1) | LARGE | ○ |
| ⋮ | ⋮ | ⋮ | ⋮ |

COMPOSITE STILL-IMAGE CREATING DEVICE CAPABLE OF CREATING A STILL IMAGE FROM MOVING IMAGES

CROSS-REFERENCE TO RELATED APPLICATIONS

This application is based upon and claims the benefit of priority from prior Japanese Patent Application No. 2003-169664, filed Jun. 13, 2003, the entire contents of which are incorporated herein by reference.

BACKGROUND OF THE INVENTION

1. Field of the Invention

The present invention relates to a composite still-image creating device and method which extracts the images of portions of a subject that have motion from a sequence of frame images in moving images and combines them with a still image to create a composite still image.

2. Description of the Related Art

Conventionally, some digital cameras have a sequence shooting mode that allows a subject to be shot several times in sequence in a single shooting operation. Such a shooting mode is used in, for example, analyzing golf swing or pitching styles because the images of a subject in motion can be recorded in sequential order.

Further, a technique has been devised which involves cutting the images of portions of a subject that have motion from each of the multiple images recorded in the sequence shooting mode and combining them into a single image. Such a technique allows the motion of a subject to be grasped visually.

BRIEF SUMMARY OF THE INVENTION

According to one aspect of the invention there is provided a composite still image creation device comprising: an acquisition unit for acquiring moving images coded using an interframe predictive coding process; a select unit which, on the basis of motion vectors used in decoding each frame image contained in the moving images acquired by the acquisition unit, selects partial images in the frame image; and a combining unit which combines the partial images selected by the select unit with a still image to create a composite still image.

According to another aspect of the invention there is provided a composite still image creation device comprising: means for acquiring moving images coded using an interframe predictive coding process; means for, on the basis of motion vectors used in decoding each frame image contained in the moving images acquired by the acquisition means, selecting partial images in the frame image; and means for combining the partial images selected by the select means with a still image to create a composite still image.

According to still another aspect of the invention there is provided a composite still image creation method comprising: acquiring moving images coded using an interframe predictive coding process; selecting, on the basis of motion vectors used in decoding each frame image contained in the acquired moving images, partial images in the frame image; and combining the selected partial images with a still image to create a composite still image.

According to a further aspect of the invention there is provided a composite still image creation program adapted to a computer provided in a composite still image creation device to execute: a process of acquiring moving images coded using an interframe predictive coding process; a process of, on the basis of motion vectors used in decoding each frame image contained in the acquired moving images, selecting partial images in the frame image; and a process of combining the selected partial images with a still image to create a composite still image.

DETAILED DESCRIPTION OF THE INVENTION

The preferred embodiments of the present invention will be described hereinafter with reference to the accompanying drawings.

First Embodiment

Figure 1:
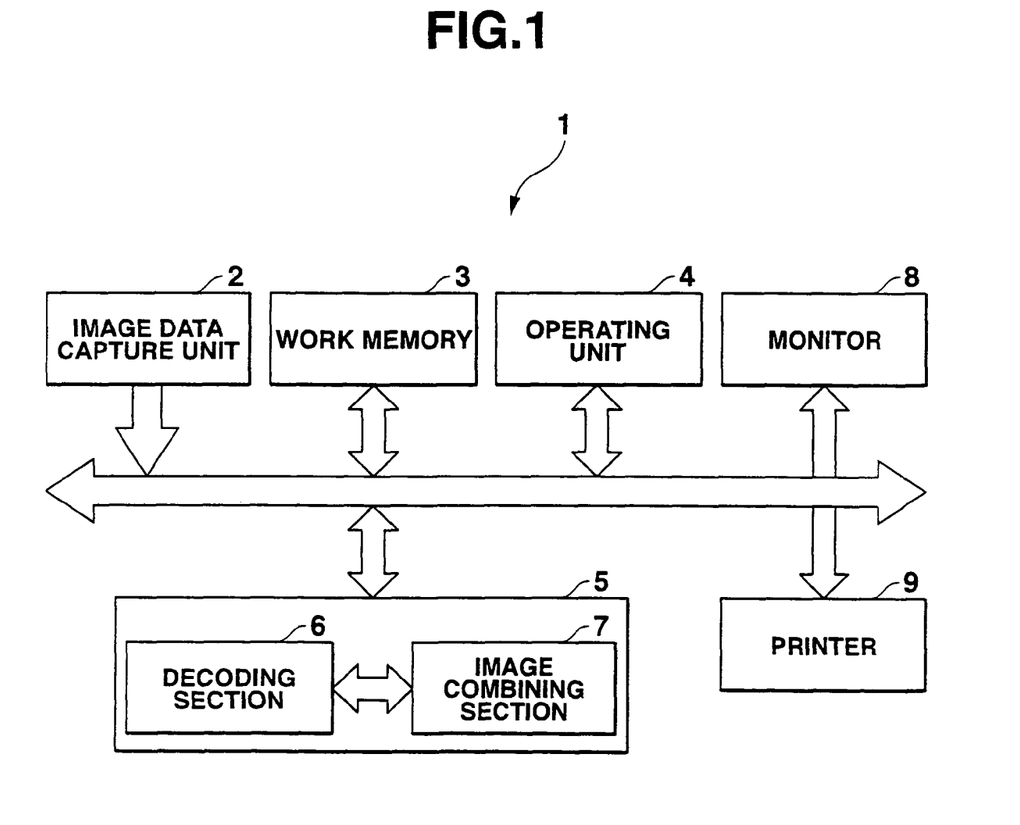
FIG. 1 is a block diagram of a composite still-image creating device which is common to the embodiments of the present invention.

FIG. 1 is a block diagram of a composite still image creating device, generally indicated at 1, which is common to all the embodiments of the present invention. The composite still image combining device 1 has a function of creating a still image that allows the motion of a subject to be grasped visually from moving image data that conform to the Motion Picture Experts Group (MPEG) standards; i.e., moving images coded using the interframe predictive coding technique. The still image combining device includes an image data capture unit 2, a work memory 3, an operating unit 4, an image processing unit 5, a monitor 8, and a printer 9.

Figure 11:
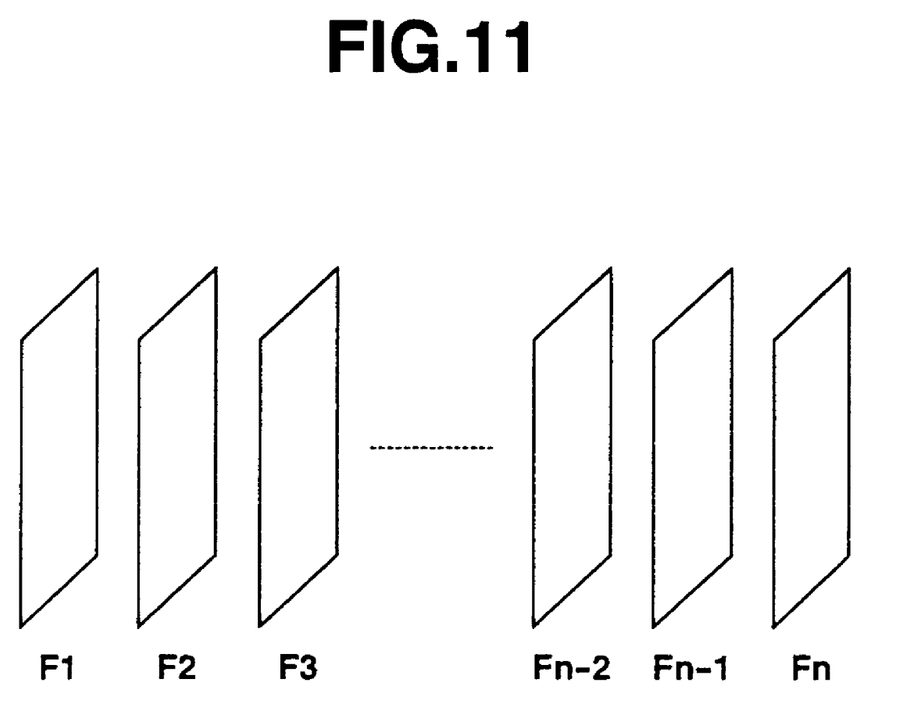
FIG. 11 is a schematic representation of moving image data.
Figure 12:
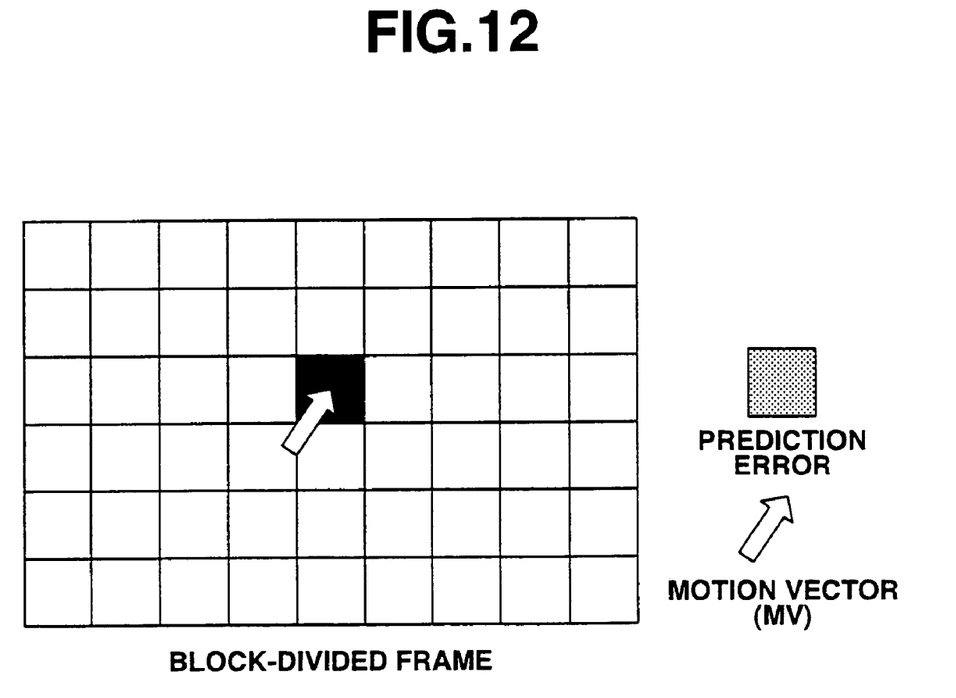
FIG. 12 is a diagram for use in explanation of the contents of data that make up a frame image.

First, an outline of MPEG-recorded moving images will be given here. That is, in the MPEG system, a sequence of frame pictures F1 through Fn that make up moving images as shown in FIG. 11 contains intra-pictures or intraframe-coded pictures (I-pictures), predictive pictures or forward prediction coded pictures (P-pictures), and bidirectional prediction coded pictures (B-pictures). The I-pictures are complete pictures recorded using intraframe coding, whereas the P- and B-pictures are ones recorded using interframe prediction coding. The P- and B-pictures are each represented by a motion vector (MV) and a prediction error for each of a predetermined number of macroblocks into which one frame is divided as shown in FIG. 12 and decoded using a previously decoded frame picture (for the P-picture, a past frame picture, and for the B-picture, a past or future frame picture) as a predictive picture for reconstruction. The motion vector is data indicating the direction and distance moved by the subject between the current and the past (or future) frame. The prediction error is data obtained by quantizing differential information in pixel value between the current and past (or future) frames by discrete cosine transform (DCT) coefficients. That is, the P- and B-pictures are pictures which cannot be created without a series of reconstruction processes starting from an I-picture.

The aforementioned moving image data capture unit 2, which captures such moving image data as described above, is comprised of, for example, a moving image encoder provided in a digital still camera or digital video camera, a recording medium, such as a hard disk, which is stored with moving image data, or a disk drive into which a video CD stored with moving image data is loaded. The work memory 3 is, for example, a DRAM which stores each frame data of moving images and composite still image data created based on the frame data in accordance with a method which will be described later. The operating unit 4 is composed of various operating keys as the user interface and includes an operating key to instruct which parts of moving images a composite still image is to be made up of.

Figure 2:
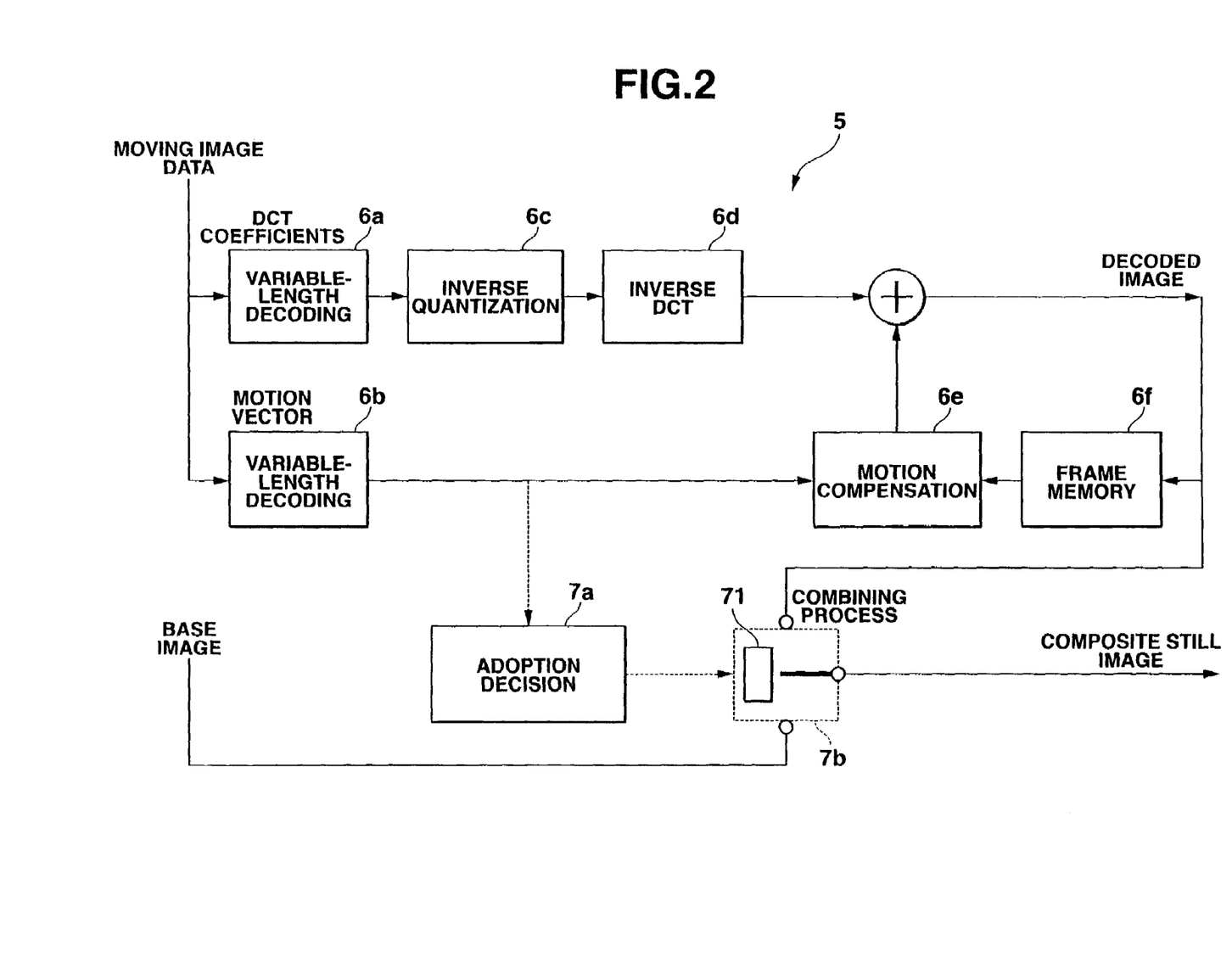
FIG. 2 is a block diagram of an image processing unit according to a first embodiment of the present invention.

The image processing unit 5 is composed of a decoding section 6 adapted to decode moving image data and an image combining section 7 adapted to create a composite still image based on the decoded data. FIG. 2 is a detailed block diagram of the image processing unit 5. The decoding section 6 is composed of first and second variable-length decoding sections 6a and 6b, an inverse quantization section 6c, an inverse DCT section 6d, a motion compensation section 6e, and a frame memory 6f. The image combining section 7 is comprised of an adoption decision section 7a and a combining section 7b. The adoption decision section 7a acts as select means of the present invention. The combining section 7b is provided with a still buffer 71, which is used during the process of creating still image data and acts as combining means of the present invention.

The monitor 8 displays moving images decoded or composite still images created in the image processing unit 5 and the printer 9 prints composite still images.

Figure 3:
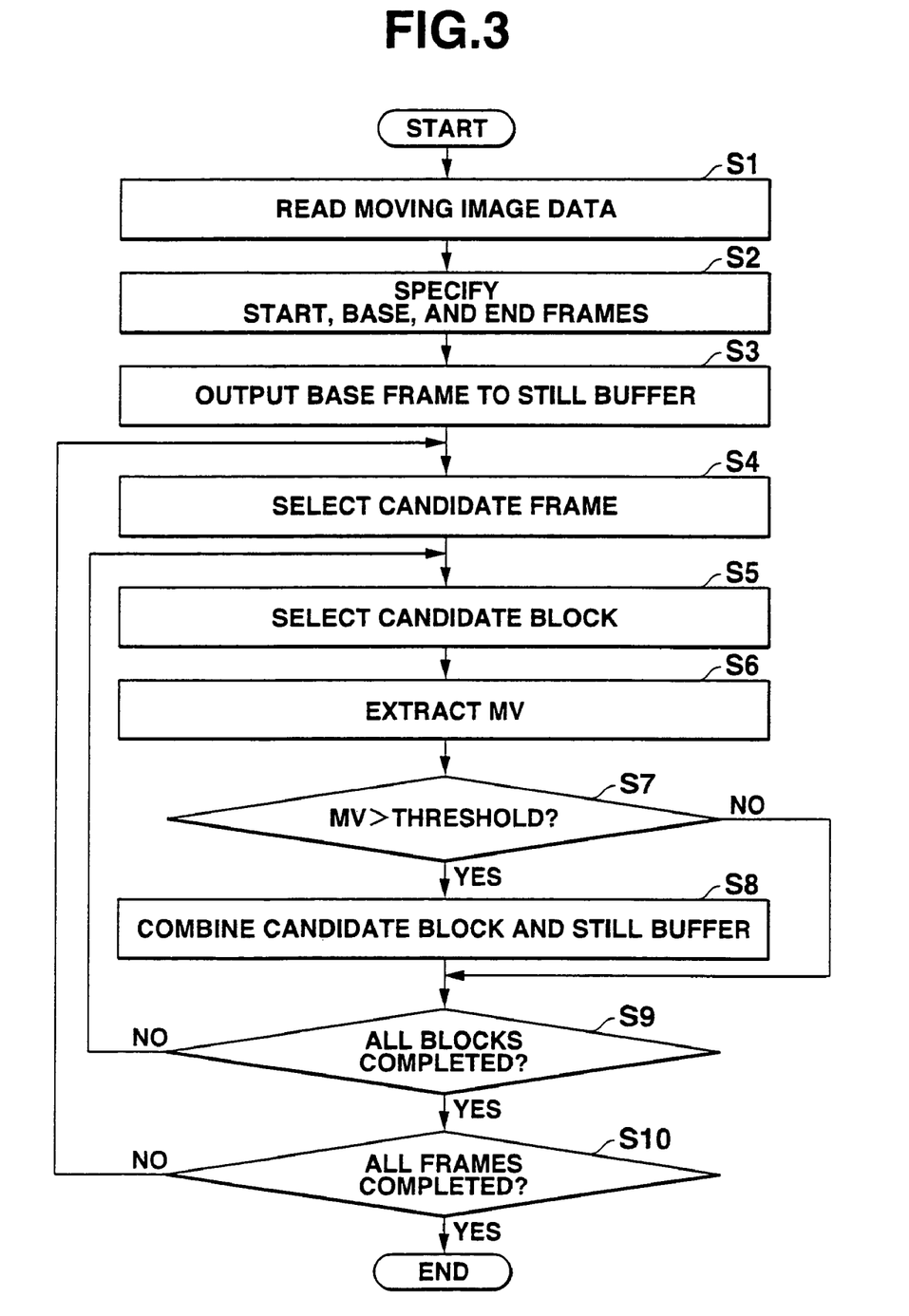
FIG. 3 is a flowchart illustrating the operation of creating a composite still image in accordance with the first embodiment.

The operation of the composite still image creation device 1 thus configured will be described next. FIG. 3 is a flowchart illustrating the operation of combining arbitrary moving images which have been recorded into a still image.

The composite still image creation device 1 reads specified moving image data from the image data capture unit 2 (step S1) and then prompts the user to specify desired start, base, and end frames from multiple frame images F1 through Fn (FIG. 11) forming moving images (step S2). The start frame refers to a frame which first becomes a candidate for processing when a composite still image is created. The end frame refers to a frame which is to be processed last. The base frame refers to a frame image that forms the base (background) when partial images contained in frames from the start frame through the end frame are combined. The type of the frame image specified as the base frame may be any one of I-, P-, and B-pictures. Alternatively, an arbitrary still image recorded separately from moving images or a blank image (monochromatic image) may be specified as the base frame.

The user specifies each of the above frames by selecting desired frame images while reproducing and displaying them from the beginning on the monitor 8. At this point, each frame image is reconstructed (recovered) by the decoding section 6 in the image processing unit 5 in accordance with the following operation. In the description which follows, the frame images F1 to Fn forming moving images are assumed to contain only I- and P-pictures for the sake of convenience.

First, the beginning frame image F1, i.e., the I-picture, is reconstructed (decoded) for each block. In this case, the image of each candidate block (hereinafter referred to as the partial image) is decoded by performing on its DTC coefficients decoding by the first variable-length decoding section 6a, inverse quantization by the inverse quantization section 6c, and inverse DCT computation by the inverse DCT section 6d in sequence. This partial image is saved in the work memory 3 and the frame memory 6f. These processes are performed on all the blocks with the result that the frame image F1 is reconstructed in the work memory 3 and the frame memory 6f.

Further, in reconstructing each of the frame images following the first frame image F2, i.e., the P-pictures, the DTC coefficients and the motion vector MV (see FIG. 12) are separated from each other and then decoded by the first and second variable-length decoding sections 6a and 6b, respectively. On the decoded DCT coefficients the inverse quantization process and the inverse DCT computation are performed in sequence to obtain image data of prediction error. The motion compensation section 6e fetches image data of a block portion represented by the decoded motion vector MV from the image (predictive image for reconstruction) saved in the frame memory 6f and adds it to the image data of prediction error, thereby reconstructing the partial image. The resulting partial image is saved in the work memory 3 and the frame memory 6f. By performing these processes on all the blocks, the frame image is created in the work memory 3. At the same time, the same frame image is saved in the frame memory 6f as a new predictive image for reconstruction. That is, the contents of the frame memory are updated.

Upon specifying the start, base and end frames, still image data of the specified base frame is stored into the still buffer 71 in the combining section 7b (step S3). When the user specifies the base frame while the moving images are being reproduced from the beginning on the monitor 8 as described above, the base frame image may be stored at that time.

Subsequently, a candidate frame (at first, the start frame) in the moving images is selected (step S4) and then a candidate block to be reconstructed in that frame is selected (step S5). The partial image of that candidate block is reconstructed in the same procedure as at the time of usual reproduction of moving images as described above. During this process, the motion vector MV is extracted in the adoption decision section 7a (step S6) and a decision is then made as to whether or not the extracted motion vector is greater than a predetermined threshold (step S7). If the motion vector MV is greater than the threshold (YES in step S7), then the reconstructed partial image is combined with the base-frame image (still image) stored in the still buffer 71 in the combining section 7b (step S8).

If, on the other hand, the motion vector MV is smaller than the threshold (NO in step S7), then the combining process is skipped and the processes in steps S6, S7 and S8 are performed on the next candidate block. Upon completion of processing on all the blocks (YES in step S9), the next frame is selected as a new candidate frame (step S4) and the processes in steps S5 to S9 are performed on this frame. That is, only partial images, each of which has been extracted from a frame image and is the image of a portion of a subject which has motion of a constant level or more with respect to the preceding frame image, are combined with the still image stored in the still buffer 71 in the order in which they are reconstructed.

Upon completion of the processing of all the frames through the end frame (YES in step S10), composite-image data stored in the still buffer 71 at this point, i.e., data of a still image that allows the motion of the subject to be grasped visually, is output to the work memory 3 and the combining process is then completed. After that, the still image output to the work memory 3 is displayed on the monitor 8 and printed by the printer 9 as instructed by the user.

In the present embodiment, as described above, in creating from moving images a still image that allows the motion of a subject to be grasped visually, only required partial images are selectively extracted based on motion vectors from multiple candidate frame images from the start frame through the end frame and then combined with a still image. Therefore, the creation of a still image can be performed in an efficient manner in comparison with a case where different frame images are compared with each other to identify portions of a subject that have motion and then the partial images thus identified are separately cut out.

In addition, in the present embodiment, the process of extracting partial images (block images) and the process of combining the partial images with a still image are performed concurrently with the processing of reconstruction (decoding) of multiple frame images to be processed. Therefore, the decoding section 6 used to reconstruct moving images can be applied to the creation of the composite still image. Accordingly, the composite still image creation device can be made simple in configuration and implemented readily and at low cost.

Second Embodiment

Figure 4:
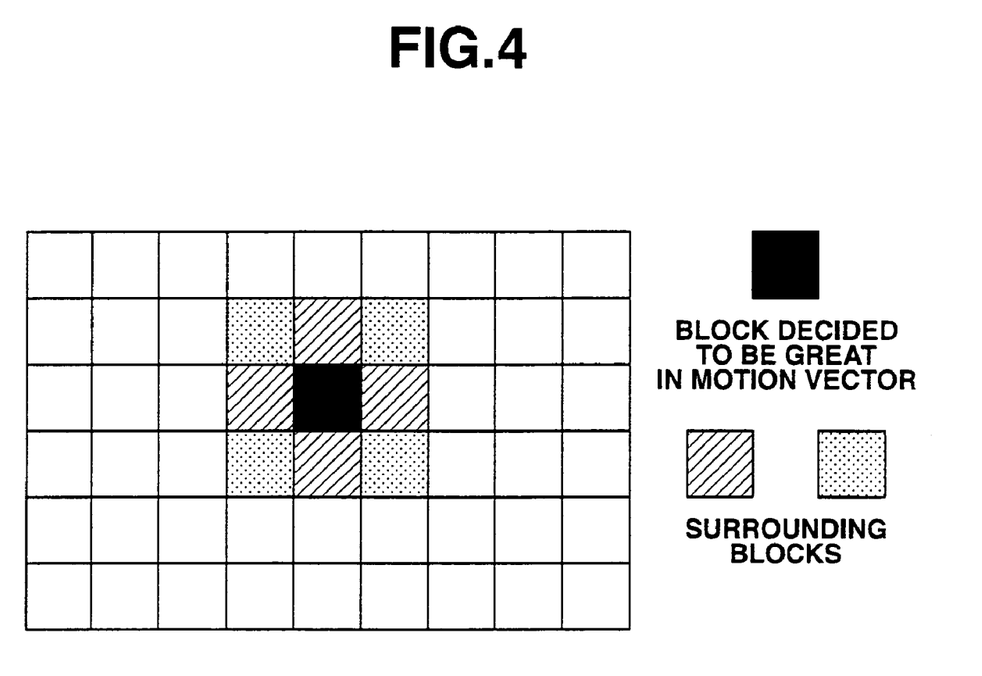
FIG. 4 shows a macroblock in one frame image.

A second embodiment of the present invention will be described next. The first embodiment is configured such that block images in which motion vectors are greater than a threshold are extracted from each frame image and then combined with a still image. In the second embodiment, when each frame image in a sequence of moving images is divided into 9×6 blocks (macroblocks) for coding as shown in FIG. 4, not only the image (partial image) of a block (block indicated in black in the diagram) in which the motion vector is greater than a threshold but also the images (other partial images) of surrounding blocks (blocks indicated hatched and dot-shaded in the diagram) are utilized to create a composite still image.

Figure 5:
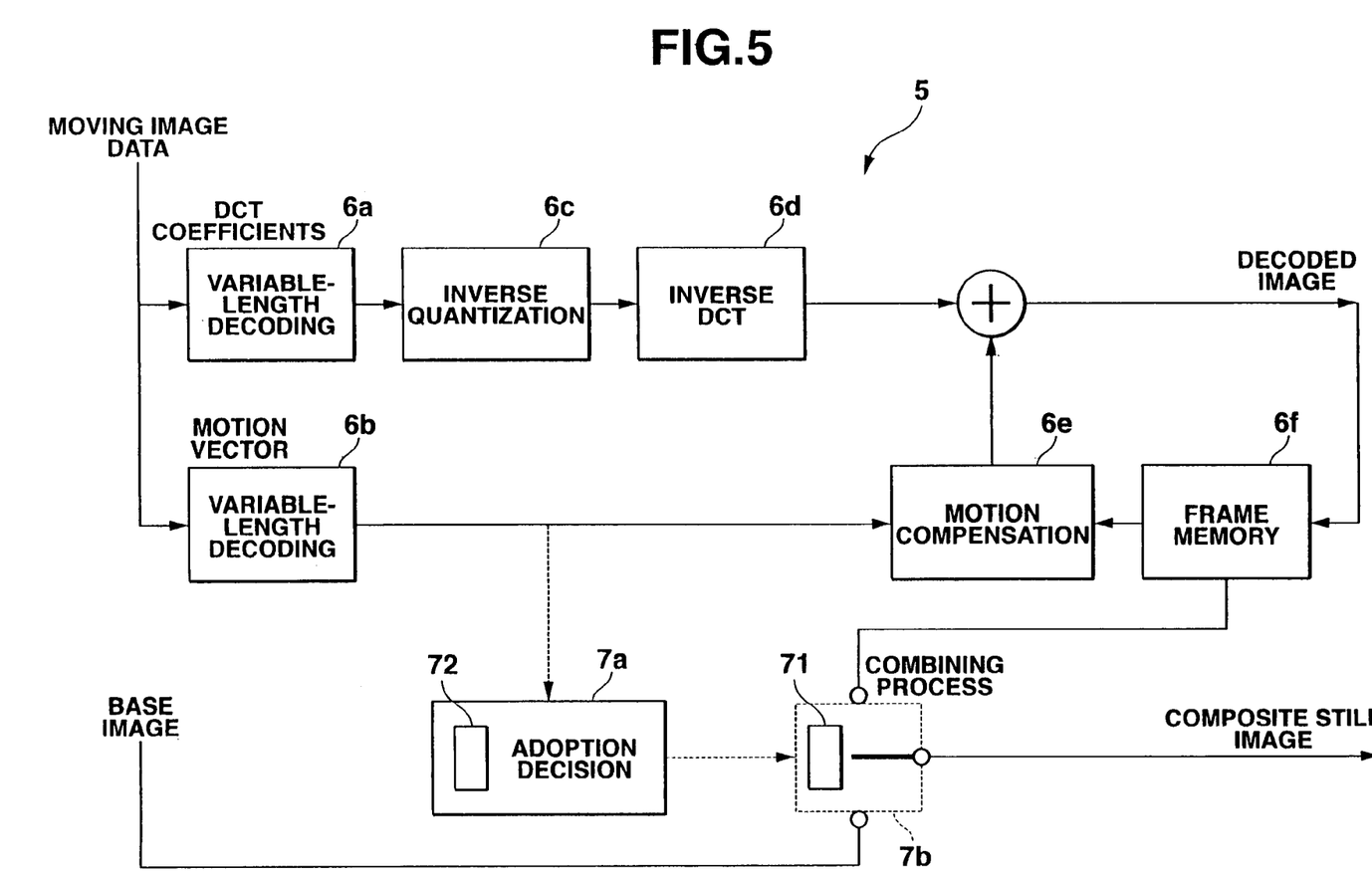
FIG. 5 is a block diagram of an image processing unit according to a second embodiment of the present invention.

FIG. 5 is a detailed block diagram of the image processing unit 5 in a composite still image creating device of the second embodiment and corresponds to FIG. 2. In this embodiment, the adoption decision section 7*a* is provided with an adoption decision buffer 72, which is a buffer (temporary memory) adapted to store the result of decision of whether or not each of the blocks of a candidate block being decoded is one to be utilized to create a composite still image. The adoption decision buffer 72 is configured to store the result of decision for each block.

In the second embodiment, as in the first embodiment, while each of the candidate frames from the start frame through the end frame is decoded, the adoption decision section 7*a* decides for each candidate block whether or not its associated motion vector is greater than a threshold. If the motion vector is detected to be greater than the threshold by the adoption decision section 7*a*, then the adoption decision buffer 72 in the adoption decision section 7*a* stores an adoption flag indicating that the image of that block is to be utilized to create a composite still image. At the same time, the buffer stores adoption flags for the other blocks that surround that block as well.

Figure 6:
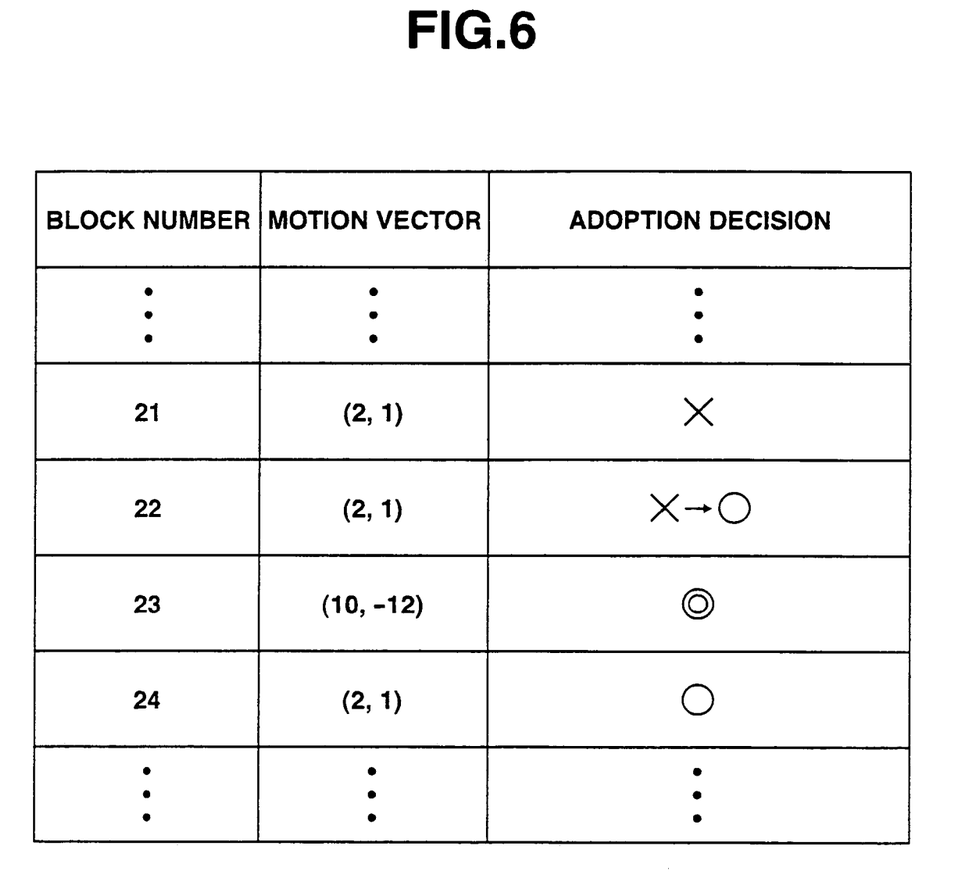
FIG. 6 is a diagram for use in explanation of the adoption flag storing operation by the adoption decision unit in accordance with the second embodiment.

FIG. 6 is a diagram for use in explanation of the adoption flag storing operation. In this diagram, the block number is one that is allocated for each block in the adoption decision buffer 72 and corresponds to the order in which each of the blocks in the same frame is decoded in sequence (from left to right and from top to bottom). The motion vector represents the motion vector for each block. The adoption decision indicates whether or not the adoption flag has been stored for each block and the cause of its storage. The symbol "X" in the adoption decision column indicates the adoption flag has not been recorded, the symbol "⊚" indicates that the adoption flag has been recorded because the motion vector associated with the corresponding block is greater than the threshold, and the symbol "○" indicates that the adoption flag has been recorded because the motion vector of another block adjacent to the corresponding block is greater than the threshold.

FIG. 6 shows the case where the threshold of the motion vector is set to, for example, (5, 5). In this case, the motion vector of each of the blocks numbered 21, 22, and 24 is (2, 1) and the motion vector of the block numbered 23 (corresponding to the block indicated in black in FIG. 4) is (10, −12). Thus, the adoption decision for each of the blocks 21 and 22 is "X" until the block numbered 22 has been decoded. At the time of decoding the block 23, the adoption decision for that block becomes "⊚" and at the same time the adoption decision for each of the blocks 22 and 24 adjacent to the block 23 will become "○". Though not shown in FIG. 6, the adoption decision for each of the blocks 13 to 15 and 31 to 33 adjacent to the block 23 will also become "○".

Upon completion of the decision and result storage processes for all the blocks, information of blocks for which the adoption flag has been stored in the adoption decision buffer 72 (the adoption decision is "⊚" or "○" in FIG. 6) at that time is sent from the adoption decision section 7*a* to the combining section 7*b*. In response to this, the combining section 7*b* reads partial images corresponding to these blocks from the frame memory 6*f* and combines each of them in sequence with a still image stored in the still buffer 71.

After that, the above processing is performed on each of the frame images while switching the candidate frames. Upon completion of the processing of all the frames through the end frame, the composite image stored in the still buffer 71, i.e., the still image that allows the motion of a subject to be grasped visually, is output to the work memory 3 as in the first embodiment and the combining processing is completed.

In the second embodiment, not only the image (partial image) of a block in which the motion vector is greater than a threshold but also the images (other partial images) of the surrounding blocks are extracted from each of the frames from the start frame through the end frame and utilized to create a composite still image. The second embodiment therefore provides the following advantage over the first embodiment.

That is, since the presence or absence of motion compensation between each frame of moving images is appropriately determined at the time the moving images are coded, motion compensation is not always performed on all the portions of a subject that have motion, i.e., on all the blocks that contain the moving subject portions. For this reason, if only blocks in which the motion vector is greater than a threshold are combined with a still image, there will exist partial images that are not combined with the still image although they contain the moving subject portions. On the other hand, when the image of a certain block forms a subject portion that has movement, the images of other blocks adjacent to that block often form that moving subject portion. According to the second embodiment, therefore, the rate at which partial images which are originally to be extracted and combined with a still image drop out can be reduced, allowing a composite still image which will be created finally to more faithfully reflect subject portions that have motion.

Moreover, as in the first embodiment, the creation of a composite still image can be performed efficiently in comparison with a case where different frame images are compared with each other to identify portions of a subject that have motion and then the partial images thus identified are separately cut out. In addition, since the decoding section 6 used to reproduce (reconstruct) moving images can also be used as it is to create a composite still image, the composite still image creation device 1 can be made simple in configuration and implemented readily.

Third Embodiment

A third embodiment of the present invention will be described next. Although the second embodiment has been described as combining images of all the blocks adjacent to a block in which its associated motion vector is greater than a threshold with a still image, the third embodiment is configured so as to combine only blocks which are adjacent to that block which have great prediction errors with the still image.

Figure 7:
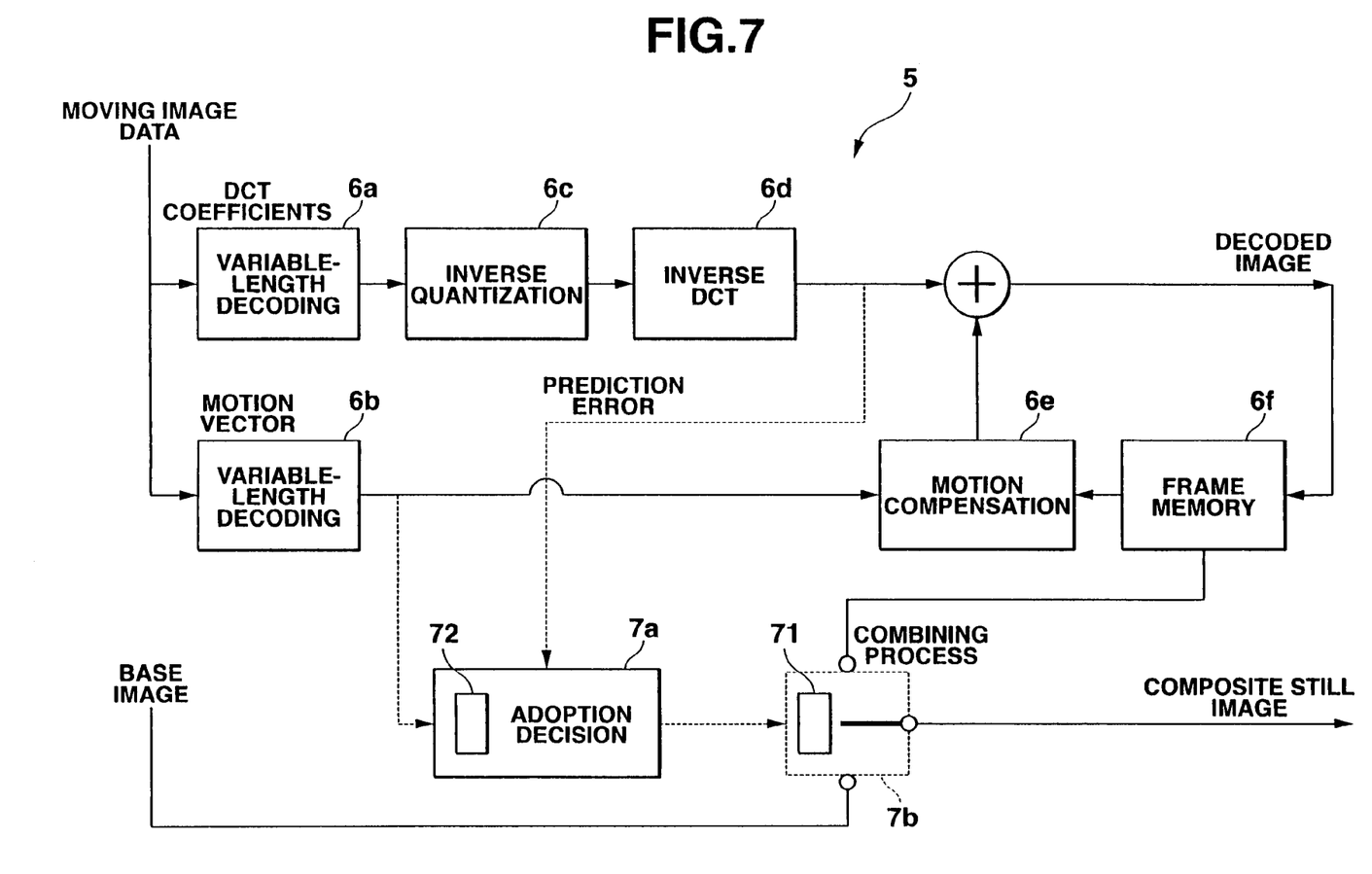
FIG. 7 is a block diagram of an image processing unit according to a third embodiment of the present invention.

FIG. 7 is a block diagram of the image processing unit 5 in a composite still image creating device according to the second embodiment and corresponds to FIG. 5. Unlike the second embodiment, this embodiment is configured such that prediction error (pixel value data) reconstructed in the inverse DCT section 6d is entered into the adoption decision section 7a and stored in the adoption decision buffer 72 for each block in addition to the abovementioned results of decision.

In this embodiment as well, during decoding of candidate frames from the start frame through the end frame, the adoption decision section 7a makes a decision of whether or not the motion vector is greater than a threshold for each candidate block. If the motion vector is greater than the threshold, then the adoption decision section 7a stores an adoption flag indicating that the corresponding block is to be combined with a still image into the adoption decision buffer 72. Further, the prediction errors of the candidate blocks are also stored into the adoption decision buffer 72. Upon completion of these processes for all the candidate blocks, a new adoption flag is stored for a block or blocks in which the stored prediction errors are greater than a predetermined threshold among blocks that are adjacent to a block for which the adoption flag has been stored. The magnitude of prediction error of a block is, for example, the sum or average of the pixel values within the block.

Figure 8:
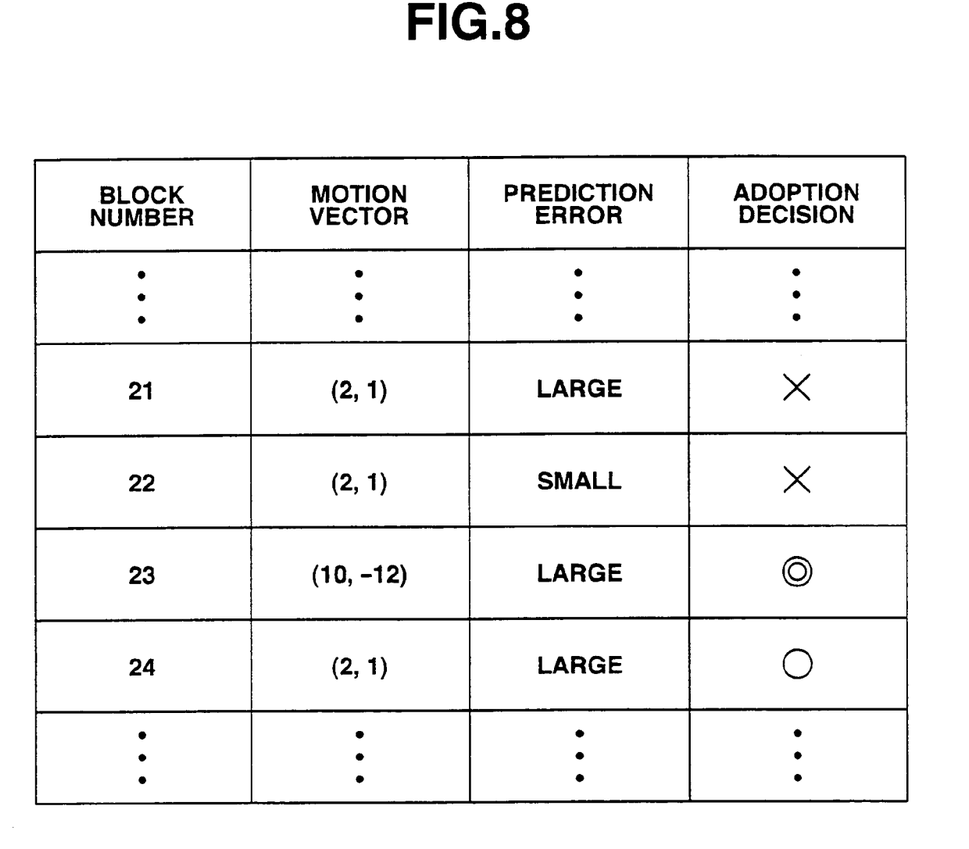
FIG. 8 is a diagram for use in explanation of the adoption-flag storing operation by the adoption decision unit in accordance with the third embodiment.

FIG. 8 is a diagram corresponding to FIG. 6 and illustrates the operation of storing the adoption flags. In this embodiment, as shown, of the blocks Nos. 22 and 24 adjacent to the block No. 23 in which the motion vector is greater than the threshold, the block No. 22 in which the prediction error is small is marked with X as the adoption decision, while the block No. 24 in which the prediction error is great is marked with ○.

Upon completion of the above processing on all the blocks, information of the blocks for which the adoption flags have been stored in the adoption decision buffer 72 (blocks marked with ⊚ and ○ in FIG. 8) is sent from the adoption decision section 7a to the combining section 8b. In response to this, the combining section 7b reads multiple partial images corresponding to these blocks from the frame memory 6f and combines each of them in sequence with the still image stored in the still buffer 71. For the subsequent operation, the third embodiment remains unchanged from the second embodiment.

In the third embodiment, as described above, the image of a block in which the motion vector is greater than a threshold and the images of blocks which are adjacent to that block which have a prediction error greater than a threshold are extracted from the candidate frame images from the start frame through the end frame and these partial images are combined with a still image. The third embodiment therefore offer the following advantages:

That is, if only blocks in which the motion vector is greater than a threshold are combined with a still image as described above, there will exist partial images that are not extracted and combined with the still image although they contain the moving subject portions. On the other hand, when the image of a certain block forms a subject portion that has motion, the images of the adjacent other blocks often form that moving subject portion. Still more do blocks in which the prediction error is great. In comparison with the second embodiment, therefore, the third embodiment provides extremely high accuracy in extraction of partial images to be combined with the still image. The subject portions that have motion can thus be combined accurately with a still image specified as a base frame.

Moreover, as in the first and second embodiments, the creation of a composite still image can be performed efficiently in comparison with a case where different frame images are compared with each other to identify portions of a subject that have motion and then the partial images thus identified are separately cut out. In addition, since the decoding section 6 used to reproduce (reconstruct) moving images can be used as it is in creating a composite still image, the composite still image creation device 1 can be made simple in configuration and implemented readily.

Fourth Embodiment

A fourth embodiment of the present invention will be described next. The third embodiment is configured such that the adoption decision section 7a decides whether or not to combine a block adjacent to a block in which the motion vector is greater than a threshold with a still image on the condition that the prediction error should be greater than a predetermined threshold. In contrast to this, the fourth embodiment adds to that condition a new condition that there is continuity in contour between the image of the adjacent block and the image of the block in which the motion vector is greater than the threshold.

Figure 9:
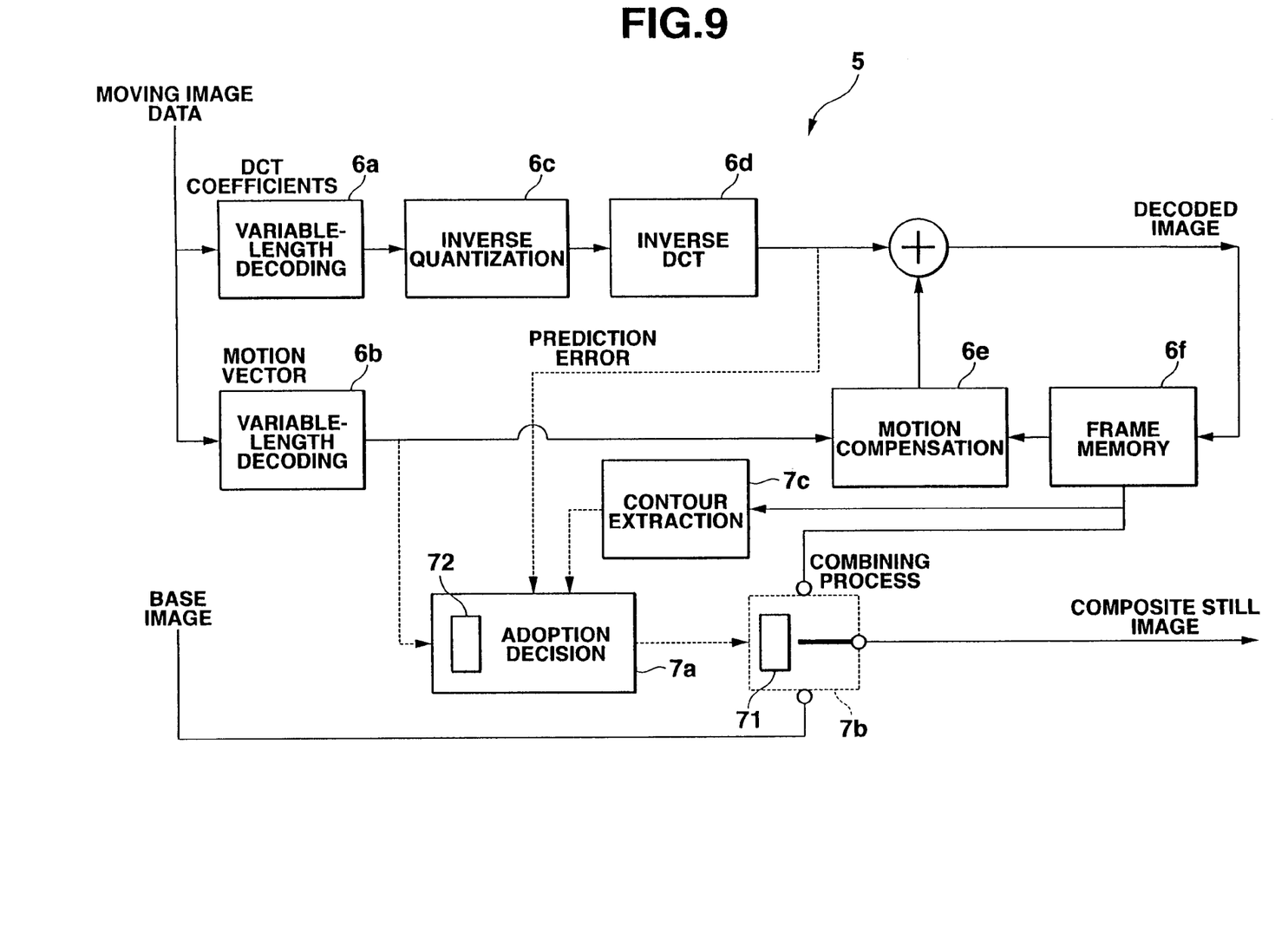
FIG. 9 is a block diagram of an image processing unit according to a fourth embodiment of the present invention.

FIG. 9 illustrates the details of the image processing unit 5 of a composite still image creation device according to the fourth embodiment and is a block diagram corresponding to the block diagram of the third embodiment shown in FIG. 7. Unlike the third embodiment, this embodiment is configured such that a contour extraction section 7c is provided which receives predictive image data for reconstruction stored in the frame memory 6f and extracts contours from the input image, and the extracted contour data are output to the adoption decision section 7a.

In this embodiment as well, during decoding of candidate frames from the start frame through the end frame, for each of the candidate blocks in which the motion vector is greater than a threshold the adoption decision section 7a stores an adoption flag indicating that the corresponding block is to be combined with a still image into the adoption decision buffer 72. Upon completion of these processes for all the candidate blocks, a new adoption flag is stored for a block in which the stored prediction error is greater than a predetermined threshold among blocks that are adjacent to a block for which the adoption flag has been stored.

Further, in this embodiment, the adoption decision section 7a compares the block for which the adoption flag has been stored with the adjacent blocks (except the block for which the adoption flag has been stored) in terms of contours in their images to conform to their positional relationship on the frame image by a predetermined method. The adoption decision section 7a then digitizes the continuity of contour between the blocks to be compared. If there is an adjacent block in which the continuity is above a given level, then the adoption decision block 7a stores a new adoption flag into the adoption decision buffer 72 for that block.

After that, as in the third embodiment, information of blocks for which the adoption flags have been stored in the adoption decision buffer 72 is sent from the adoption decision section 7a to the combining section 7b and consequently multiple partial images are read out of the frame memory 6f by the combining section 7b. Each of the partial images is then combined in sequence with a still image stored in the still buffer 71.

As described above, the fourth embodiment, in deciding whether or not to combine each of the blocks adjacent to a block in which the motion vector is greater than a threshold with a still image, adds a condition that there should be at least a constant level of continuity in contour between its image and the image of the block in which the motion vector is greater than a threshold. In comparison with the third embodiment, therefore, the fourth embodiment can extract partial images to be combined with the still image from each frame image with much more accuracy. As the result, only portions of a subject that have motion can be combined with a still image specified as the base frame.

Moreover, as in the first, second and third embodiments, the creation of a composite still image can be performed efficiently in comparison with a case where different frame images are compared with each other to identify portions of a subject that have motion and then the partial images thus identified are separately cut out. In addition, since the decoding section 6 used to reconstruct moving images can be used as it is in creating a composite still image, the composite still image creation device 1 can be made simple in configuration and implemented readily.

Fifth Embodiment

A fifth embodiment of the present invention will be described next. This embodiment is configured such as to, in combining partial images extracted in the same way as in the third embodiment with a still image during decoding of candidate frames from the start frame through the end frame, correct the position of each partial image on the still image.

Figure 10:
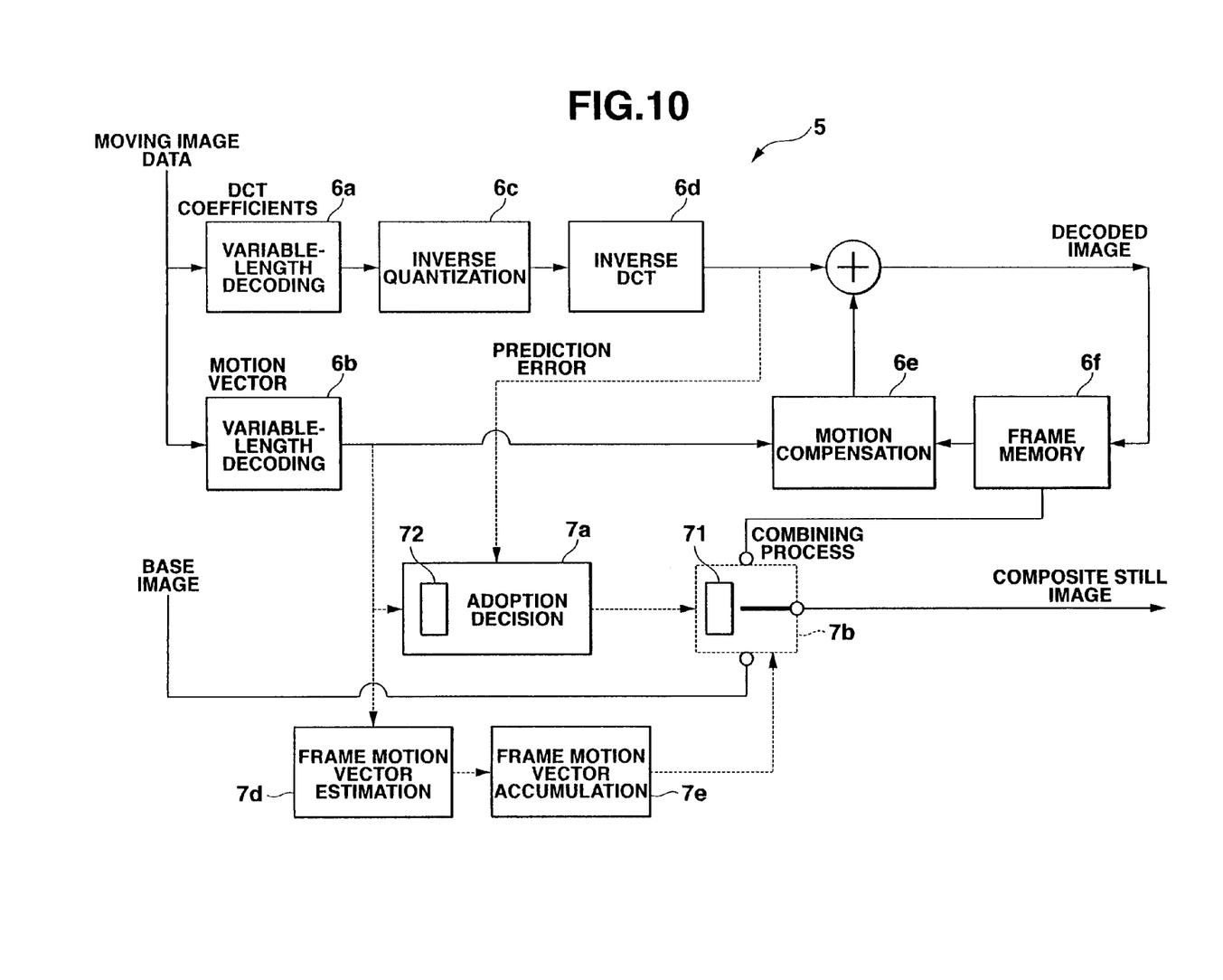
FIG. 10 is a block diagram of an image processing unit according to a fifth embodiment of the present invention.

FIG. 10 illustrates the details of the image processing unit 5 of a composite still image creation device according to the fifth embodiment and is a block diagram corresponding to the block diagram of the third embodiment shown in FIG. 7. Unlike the third embodiment, in this embodiment, the image combining section 7 (FIG. 1) has a frame motion vector estimation section 7d and a frame motion vector accumulation section 7e which acts as operations means of the invention as well as the adoption decision section 7a and the combining section 7b. The motion vector of a candidate block decoded in the second variable-length decoder 6b is input to the frame motion vector estimation section 7d.

In this embodiment, during decoding of candidate frames, the image combining section 7 operates as follows: That is, the adoption decision section 7a makes a decision of whether or not to combine each of the images of all blocks in the same frame with a still image in the same procedure as in the third embodiment and then stores the results of decisions into the adoption decision buffer 72. Concurrently with these operations, the frame motion vector estimation section 7d performs statistical processing on input motion vectors of the respective blocks to count the number of times they appear by each content and outputs the final processing results to the frame motion accumulation section 7e. On the basis of the number of times the input motion vectors appear by each content (the number of blocks), the frame motion vector accumulation section 7e calculates a frame motion vector indicating the tendency of overall motion in the blocks and outputs it to the combining section 7b.

The calculation of the frame motion vector is such that, when the motion vector that appears the most frequently satisfies requirements that the frequency of appearance is above a set number and the motion vector is smaller than a set threshold (this is different from a threshold used in deciding whether or not to combine a block with a still image), it is determined to be the frame motion vector, otherwise, it is set to (0, 0) indicating no motion.

For candidate frame images which underwent a camera shake at the time of shooting, it is extremely probable that the contents of the motion vectors of blocks in a region of a scene, such as a background, which has originally no motion, will become identical. Such a situation corresponds to the case where the contents of the motion vectors of blocks are as shown in FIG. 8 and blocks, such as blocks 21, 22 and 24, which have a small motion vector of (2, 1) occupy the greater part of a frame. If the motion vector (2, 1) meets the above requirements, it is output to the combining section 7b as a frame motion vector.

Upon receipt of the result of adoption decision for each block from the adoption decision section 7a, the combining section 7b reads multiple partial images from the frame memory 6f and combines each of them in sequence with a still image stored in the still buffer 71. At this point, the combining section 7b shifts each of the read partial images from its original block position in a predetermined direction by a distance indicated by the frame motion vector and then combines it with the still image. Thereby, the position displacement of each of the partial images caused by the camera shake is compensated for. The other operations remain unchanged from those in the third embodiment.

Thus, the fifth embodiment can compensate for the position displacement caused by a camera shake at the time of shooting in combining each of partial images extracted from each frame image with a still image. It therefore becomes possible to exclude the effect of a camera shake at the time of shooting from a composite still image to be created finally, resulting in the improved quality of the composite still image.

Moreover, as in the first, second, third and fourth embodiments, the creation of a composite still image can be performed efficiently in comparison with a case where different frame images are compared with each other to identify portions of a subject that have motion and then the partial images thus identified are separately cut out. In addition, since the decoding section 6 used to reconstruct moving images can be used as it is in creating a composite still image, the composite still image creation device 1 can be made simple in configuration and implemented readily.

Although, in the fifth embodiment, the positions on a still image in which partial images are to be placed are corrected based on frame motion vectors at the time the partial images are combined with the still image, this is not restrictive. For example, the fifth embodiment may be modified so as to provide the adoption decision section 7a with a buffer to store the motion vectors of all of candidate blocks, cause the frame motion vector accumulation section 7e to output a frame motion vector to the adoption decision section 7a, and cause the adoption decision section 7a to correct all the motion vectors stored in that buffer on the basis of the frame motion vector and then perform the abovementioned decision processing on each block. Even in this case, the positions on a still image in which partial images are to be placed will be corrected based on the frame motion vectors.

Although the fifth embodiment has been described as being based on the third embodiment, the frame motion vector estimation section 7d and the frame motion vector accumulation section 7e may be added to the other embodiments to thereby exclude the effect of a camera shake at the time of shooting from a composite still image.

Although the invention has been described in terms of a composite still image creation device that creates a composite still image which allows the motion of a subject to be grasped visually and displays or prints it, the principles of the invention are equally applicable to a digital still camera having a moving image (movie) shooting function and a digital video camera. The data processing carried out by the image processing unit 5 can be implemented without using a dedicated hardware resource. Therefore, the invention can also be carried out through the use of a general-purpose personal computer and software adapted to perform the same data processing as the image processing unit 5.

What is claimed is:

1. A composite still image creation device comprising:
   an acquisition unit which acquires moving image data coded using an interframe predictive coding process, wherein the moving image data includes motion vector data and comprises a plurality of frame images each of which is divided into a plurality of macroblocks, and wherein the motion vector data is included in each of the macroblocks;
   an extraction unit which extracts the motion vector data in one macroblock in one frame image of the moving image data acquired by the acquisition unit;
   a selection unit which determines whether the one macroblock is to be selected as a partial image based only on the motion vector data in the one macroblock extracted by the extraction unit and without referring to data in another macroblock, wherein the selection unit further selects, as an additional partial image, at least one macroblock adjacent to the macroblock selected as the partial image irrespective of a value of the motion vector data of the at least one adjacent macroblock; and
   a combining unit which combines the partial images selected by the selection unit with a still image.

2. The composite still image creation device according to claim 1, wherein when the motion vector data is greater than a predetermined threshold, the selection unit selects the macroblock having the motion vector data as the partial image.

3. The composite still image creation device according to claim 1, wherein the selection unit further comprises a selection condition decision section which determines whether each of the at least one adjacent macroblock satisfies a predetermined selection condition so as to only select an adjacent macroblock that satisfies the predetermined selection condition.

4. The composite still image creation device according to claim 3, wherein the selection condition decision section determines whether prediction error data used to decode the frame data together with the motion vector data is greater than a predetermined threshold.

5. The composite still image creation device according to claim 3, further comprising a contour extraction unit which extracts contours of the respective macroblocks in each of the plurality of frame images, and
   wherein the selection condition decision section determines whether a degree of continuity between the contour of the adjacent macroblock extracted by the contour extraction unit and the contour of the macroblock already extracted is greater than a predetermined threshold.

6. A composite still image creation device comprising:
   an acquisition unit which acquires moving image data coded using an interframe predictive coding process, the moving image data already including motion vector data;
   a specification unit arranged to specify arbitrarily, in accordance with a user operation, any one of a plurality of frame images which comprise the moving image data acquired by the acquisition unit;
   an extraction unit which extracts the motion vector data from the moving image data acquired by the acquisition unit;
   a selection unit which selects a partial image from a frame image included in the moving image data based on the motion vector data extracted by the extraction unit; and
   a combining unit which combines the partial image selected by the selection unit with a frame image specified by the specification unit.

7. The composite still image creation device according to claim 6,
   wherein the specification unit is adapted to be able to specify three frame images;
   wherein the selection unit selects a plurality of partial images from the plurality of the frame images based on motion vector data used for decoding a plurality of frame images constituting any two frame images of the three frame images specified by the specification unit; and
   wherein the combining unit combines the partial images selected by the selection unit with the remaining frame image of the three frame images specified by the specification unit.

8. A composite still image creation device comprising:
   means for acquiring moving image data coded using an interframe predictive coding process, the moving image data including motion vector data, wherein the moving image data comprises a plurality of frame images each of which is divided into a plurality of macroblocks, and the motion vector data is included in each of the macroblocks;
   means for extracting the motion vector data in one macroblock in one frame of the moving image data acquired by the acquiring means;
   means for determining whether the one macroblock is to be selected as a partial image based only on the motion vector data in the one macroblock extracted by the extracting means and without referring to data in another macroblock, wherein the determining means further selects, as an additional partial image, at least one macroblock adjacent to the macroblock selected as the partial image irrespective of a value of the motion vector data of the at least one adjacent macroblock; and
   means for combining the partial images selected by the determining means with a still image.

9. A method comprising:
operating a still image creation device to acquire moving image data coded using an interframe predictive coding process, the moving image data including motion vector data, wherein the moving image data comprises a plurality of frame images each of which is divided into a plurality of macroblocks, and the motion vector data is included in each of the macroblocks;
extracting the motion vector data in one macroblock in one frame of the acquired moving image data;
determining whether the one macroblock is to be selected as a partial image based only on the extracted motion vector data in the one macroblock and without referring to data in another macroblock, and further selecting, as an additional partial image, at least one macroblock adjacent to the macroblock selected as the partial image irrespective of a value of the motion vector data of the at least one adjacent macroblock; and
combining the selected partial images with a still image.

10. A recording medium storing a computer program which is executable by a computer of a composite still image creation device to cause the composite still image creation device to execute functions comprising:
acquiring moving image data coded using an interframe predictive coding process, the moving image data including motion vector data, wherein the moving image data comprises a plurality of frame images each of which is divided into a plurality of macroblocks, and the motion vector data is included in each of the macroblocks;
extracting the motion vector data in one macroblock in one frame of the acquired moving image data;
determining whether the one macroblock is to be selected as a partial image based only on the extracted motion vector data in the one macroblock and without referring to data in another macroblock, and further selecting, as an additional partial image, at least one macroblock adjacent to the macroblock selected as the partial image irrespective of a value of the motion vector data of the at least one adjacent macroblock; and
combining the selected partial images with a still image.

11. A composite still image creation device comprising:
means for acquiring moving image data coded using an interframe predictive coding process, the moving image data already including motion vector data;
means for specifying arbitrarily, in accordance with a user operation, any one of a plurality of frame images which comprise the moving image data acquired by the acquiring means;
means for extracting the motion vector data from the moving image data acquired by the acquiring means;
means for selecting a partial image from a frame image included in the moving image data based on the motion vector data extracted by the extracting means; and
means for combining the partial image selected by the selecting means with a frame image specified by the specifying means.

12. A method comprising:
operating a still image creation device to acquire moving image data coded using an interframe predictive coding process, the moving image data already including motion vector data;
specifying arbitrarily, in accordance with a user operation, any one of a plurality of frame images which comprise the acquired moving image data;
extracting the motion vector data from the acquired moving image data;
selecting a partial image from a frame image included in the moving image data based on the extracted motion vector data; and
combining the selected partial image with the specified frame image.

13. A recording medium storing a computer program which is executable by a computer of a composite still image creation device to cause the composite still image creation device to execute functions comprising:
acquiring moving image data coded using an interframe predictive coding process, the moving image data already including motion vector data;
specifying arbitrarily, in accordance with a user operation, any one of a plurality of frame images which comprise the acquired moving image data;
extracting the motion vector data from the acquired moving image data;
selecting a partial image from a frame image included in the moving image data based on the extracted motion vector data; and
combining the selected partial image with the specified frame image.

* * * * *